Aug. 5, 1958     F. A. ENCINAS     2,846,021
EXHAUST FILTER FOR INTERNAL COMBUSTION GAS ENGINES
Filed Feb. 20, 1956
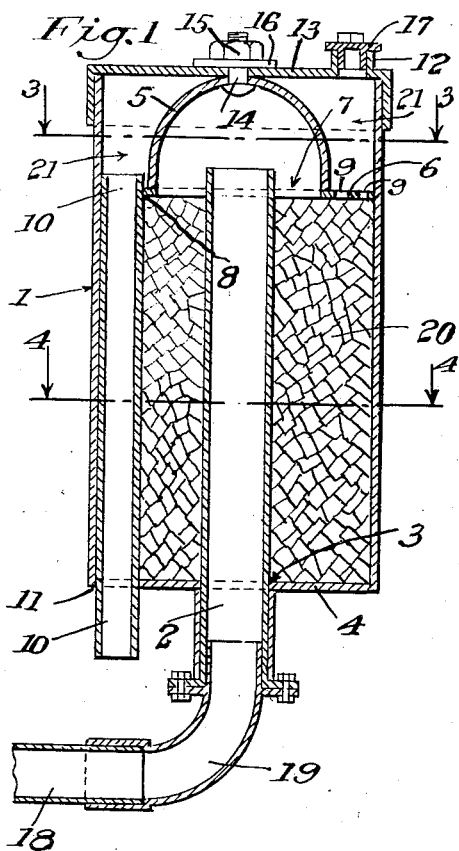
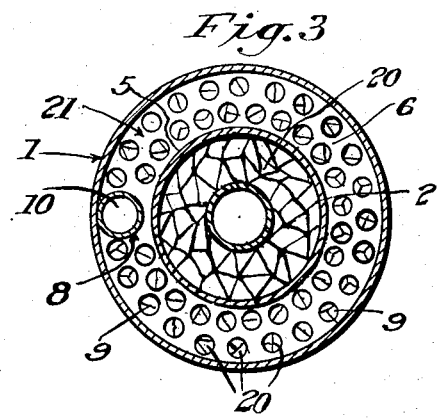
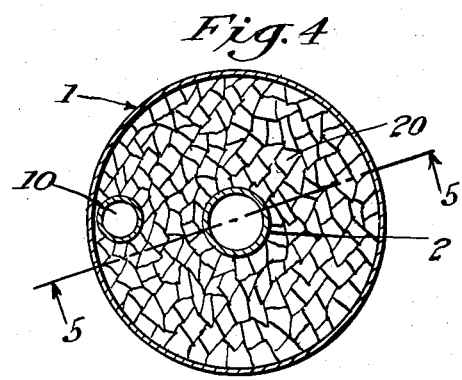
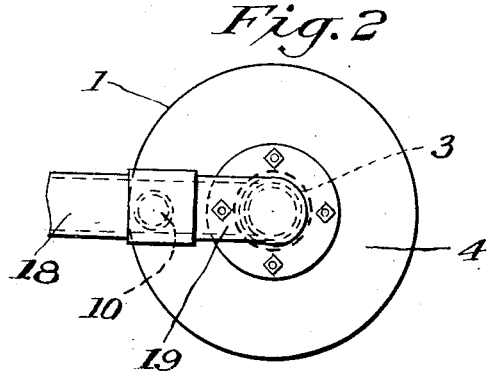
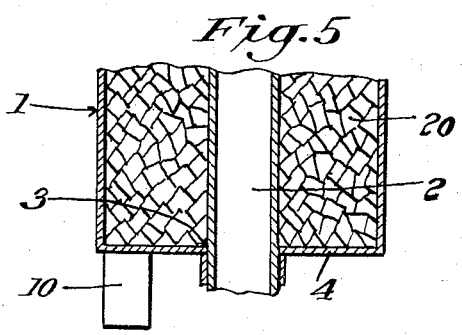
INVENTOR:
Frank A. Encinas,
BY
Alan Franklin,
ATTORNEY.

United States Patent Office 2,846,021
Patented Aug. 5, 1958

2,846,021

EXHAUST FILTER FOR INTERNAL COMBUSTION GAS ENGINES

Frank A. Encinas, Los Angeles, Calif.

Application February 20, 1956, Serial No. 566,637

1 Claim. (Cl. 183—44)

This invention relates to air filters, and more particularly to an exhaust filter for internal combustion engines.

The general object of the invention is to provide an air filter of the character stated for filtering impure gases from the atmosphere.

A more particular object of the invention is to provide an air filter which may be connected to the exhaust of internal combustion engines of automobiles, busses, trucks and other motor vehicles for reducing hydrocarbon and monoxide gases and fumes produced by said engines.

Another object is to provide a filter of the character stated including a receptacle containing irregular chunks of plaster of Paris between which the products of combustion of an internal combustion engine are directed and filtered thereby.

Other objects and advantages of my invention will appear hereinafter as this specification progresses.

The invention is illustrated in the annexed drawing, forming a part of this specification, in which:

Fig. 1 is a vertical longitudinal section of my invention shown connected to the exhaust of a motor vehicle.

Fig. 2 is a bottom plan view of my invention as shown in Fig. 1.

Fig. 3 is a horizontal section of my invention taken on line 3—3 of Fig. 1.

Fig. 4 is a horizontal section of my invention taken on line 4—4 of Fig. 1.

Fig. 5 is a fragmentary longitudinal section of the lower portion of my invention taken on line 5—5 of Fig. 4.

Referring to the annexed drawing in which the same parts are designated by the same reference numerals in all of the views, my invention includes generally a vertical cylindrical filter receptacle 1, an inlet tube 2 extending vertically and centrally upwardly through an opening 3 in the lower wall 4 of said receptacle into said receptacle to a point in the upper part thereof; a dome 5 in the upper end of said receptacle, of large diameter than said inlet tube 2, the upper end of which tube extends upwardly centrally into the lower end portion of said dome 5; a horizontal disc 6, located in the upper part of the receptacle 1 against the lower end of said dome 5, which disc 6 is provided with a central opening 7, a smaller opening 8 outwardly of said larger central opening 7 and a multiplicity of perforations 9; an outlet tube 10 extending downwardly from the upper end portion of the receptacle 1 through the opening 8 in said disc 6 at one side of said inlet tube 2 and through an opening 11 in the lower wall 4 of the receptacle 1, and a small water inlet 12 in the upper end cap 13 which is detachably fitted on the upper end of said receptacle 1.

The dome 5 is secured at its upper end to the upper wall of cap 13 of the receptacle 1 by a bolt 14 and nut 15 threaded on the upper end of said bolt against a washer 16 on the upper outer side of said upper wall of said cap 13.

The water inlet 12 is normally closed by a detachable cap 17.

The lower inlet end of the inlet tube 2 is detachably connected to the exhaust pipe 18 of an automobile or other motor vehicle by means of a conventional coupling 19.

The filter receptacle 1 is filled with suitable filtering material, preferably irregular chunks of plaster of Paris 20, around the inlet pipe 2 and outlet tube 10, between the bottom wall 4 of the receptacle 1 and the perforated horizontal disc 6.

The operation of my invention is as follows:

The filter receptacle 1 being supplied with plaster of Paris 20 as above described, and a small amount of water being supplied through the water inlet 12 and through the perforated disc 6 to the chunks of plaster of Paris 20, the lower end of the inlet 2 is coupled to the outer end of the exhaust pipe 18 of a motor vehicle by the coupling 19. As the motor vehicle is driven by its internal combustion engine the products of combustion of said engine are discharged from its exhaust pipe 18 into the lower end of the inlet tube 2 and passes upwardly through said inlet tube into the dome 5, from which dome said products of combustion pass downwardly through the large central opening 7 in the disc 6 into and through the spaces between the chunks of plaster of Paris 20 the surfaces of which being slightly moistened by the water introduced into the filler receptacle through the small water inlet 12 as above described. Said products of combustion after passing downwardly through said central disc opening 7 pass first downwardly through the moistened chunks of plaster of Paris 20 to the bottom 4 of the receptacle 1 and then upwardly between said chunks of plaster of Paris and the perforations 9 in the disc 6, into the space 21 in the upper end of the receptacle 1 around the dome 5, from which space said products of combustion from the exhaust pipe 18 of said internal combustion engine, having been filtered between the chunks of plaster of Paris 20 in the receptacle, then pass downwardly out of the upper end space 21 in the receptacle 1, through the outlet pipe 10 into the atmosphere, and the products of combustion in passing through said chunks of plaster of Paris 20 break the compression air and the impure gases, such as hydrocarbon and monoxide gas and fumes are removed from the filtered products of combustion and prevented from discharging into the atmosphere.

Upon removing the cap 13 together with the dome 5 from the upper end of the receptacle 1, my filter may be washed and cleaned out, for example, by water or air projected into the upper end of said receptacle by a hose or otherwise.

I claim:

An air filter comprising a receptacle constructed and arranged with an inlet tube, a dome in the upper end of said receptacle into the lower end of which dome extends the upper end of said inlet tube, a perforated disc extending around the upper end portion of said inlet tube and against the lower end of said dome, whereby said products of combustion discharged by from the upper end of said inlet tube into said dome are discharged by said dome downwardly through said perforated disc into plaster of Paris below said disc around said inlet tube, and an outlet tube extending downwardly through said disc and bottom wall of said receptacle for discharging said filtered products of combustion from the upper end of said receptacle, when said filtered products pass upwardly from said plaster of Paris through said perforated disc into said upper end of said receptacle, a detachable cap closing the top of said receptacle, and means for securing said dome to the upper wall of said cap.

(References on following page)

References Cited in the file of this patent

UNITED STATES PATENTS

| Number | Name | Date |
|---|---|---|
| 73,073 | Bierce | Jan. 7, 1868 |
| 156,513 | Venners et al. | Nov. 3, 1874 |
| 219,705 | Fleming | Sept. 16, 1879 |
| 432,842 | Sherman | July 22, 1890 |
| 2,127,645 | Kinney et al. | Aug. 23, 1938 |
| 2,787,119 | Giambruno | Apr. 2, 1957 |

FOREIGN PATENTS

| Number | Country | Date |
|---|---|---|
| 560,123 | Great Britain | Mar. 21, 1944 |